March 22, 1949.  G. R. ANDERSON  2,465,052
MOTOR CONTROL SYSTEM
Filed June 20, 1947
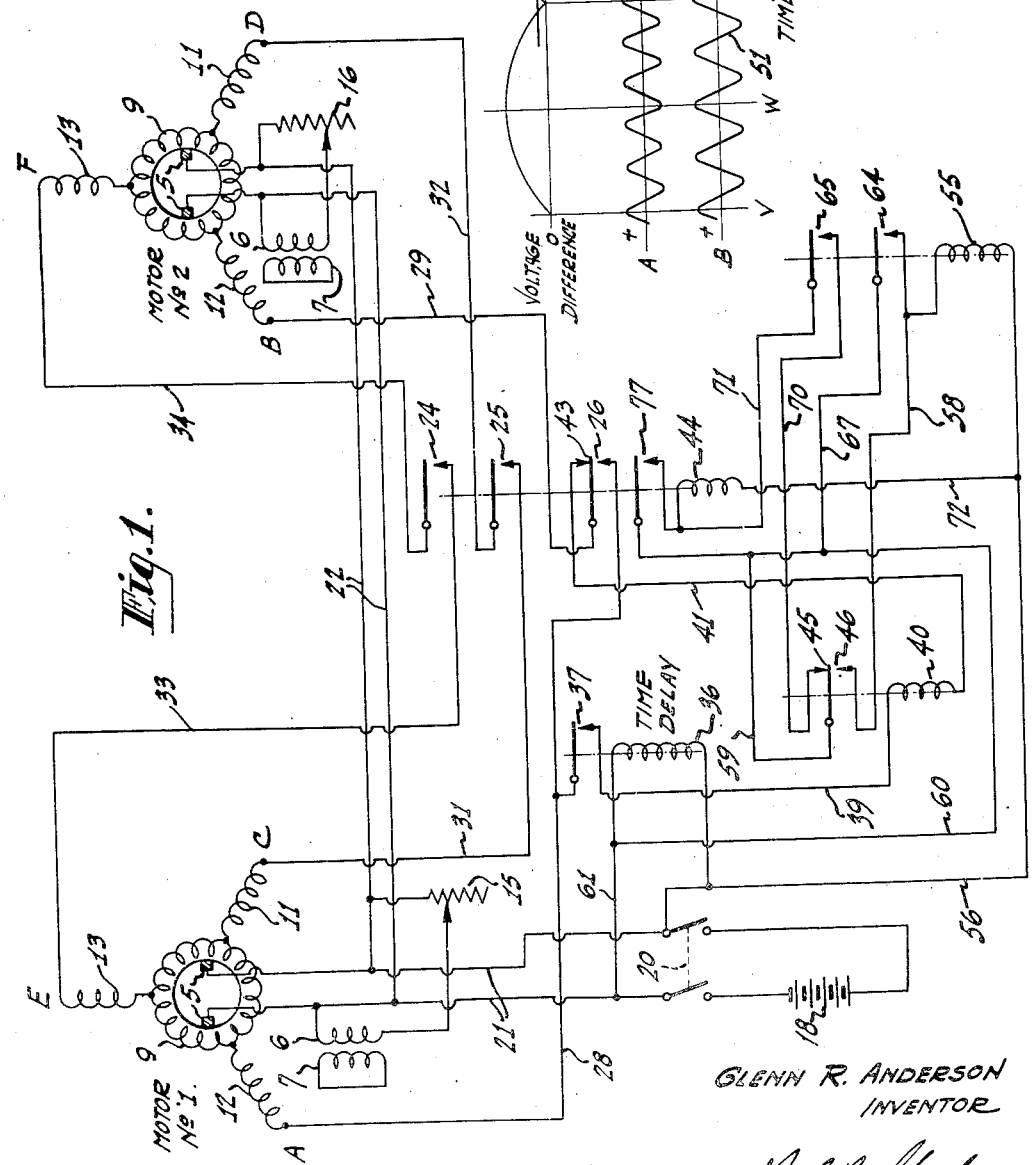
GLENN R. ANDERSON
INVENTOR
BY *Orl R. Hoshaw*
ATTORNEY Patented Mar. 22, 1949

2,465,052

UNITED STATES PATENT OFFICE 2,465,052

MOTOR CONTROL SYSTEM

Glenn R. Anderson, Burbank, Calif., assignor to Radio Corporation of America, a corporation of Delaware Application June 20, 1947, Serial No. 755,875

8 Claims. (Cl. 318—43)

This invention relates to control systems and particularly to a switching system for automatically interlocking direct current powered multiduty motors.

The self-synchronous type of multiple motor drive is well known. Such a system is supplied with alternating current energy of a definite frequency and thus may be interlocked at standstill and brought up to speed and run in synchronism. A system of this general type is disclosed and claimed in Miller U. S. Patent No. 2,354,329 of July 25, 1944, while another type of interlock system is disclosed and claimed in Sharp U. S. Patent No. 2,412,656 of December 17, 1946. These systems may be used where an alternating current source is available, or, if direct current is the supply source, a direct current to alternating current converter is employed as illustrated in the Miller patent mentioned above.

The present invention is directed to an automatic system of interlocking two or more direct current multiduty motors so that the rotors thereof may be interconnected when no voltage differential exists between the respective alternating current terminals of the rotors to be connected. Such a system is desired for portable motion picture sound recording systems used on locations or other places where a source of alternating current is not available and batteries must be used. The motors to be interlocked may be those driving the picture camera and the sound recorder. The problem presented, therefore, is similar to the interlocking of two alternating current generators driven by separate prime movers. In the case of generators, various types of indicators have been employed to show when the voltage at the respective terminals to be connected is zero, or substantially so, so that the switches may be closed without injury to the apparatus. These devices, of course, require a skilled operator while the present invention permits the interlocking operation to be performed automatically after the main motor power switch has been closed.

The principal object of the invention, therefore, is to facilitate the connecting of alternating current terminals when substantially no voltage differential exists between them.

Another object of the invention is to provide an improved system for interlocking a plurality of multiduty motors so that they rotate synchronously.

A further object of the invention is to provide an automatic switching system for connecting the alternating current terminals of direct current multiduty motors when at their zero voltage relationship.

A still further object of the invention is to provide an improved switching method for interconnecting the alternating current terminals of direct current multiduty motors for interlocking said motors.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a combination schematic and diagrammatic view of the control system of the invention; and Fig. 2 is a graph showing the operation of the system of Fig. 1.

Referring now to the drawings, similar multiduty motors No. 1 and No. 2 consist of commutator brushes 5, field windings 6 with their respective tertiary or damping windings 7, continuous rotor windings 9, and booster windings 11, 12 and 13, the latter being connected to the usual slip rings. A typical direct current power source may supply any suitable voltage such as 96 volts to the brushes 5 while any suitable final alternating potential may result such as 220 volts at the terminals of the booster windings when the motors have reached their normal running speed. The field windings 6 for determining the motor speeds are controlled by respective rheostats 15 and 16.

The motors are energized from any standard source of direct current such as a battery 18 which supplies current to the brushes 5 over conductors 21 to motor No. 1, and over conductors 22 to motor No. 2 when a switch 20 is closed. The slip rings of the motors are interconnected over switch contacts 24, 25 and 26 when closed, windings 12 being connected from the point A over conductor 28, switch contact 26 and conductor 29 to point B; windings 11 being connected from point C over conductor 31, contact 25 and conductor 32 to point D; and windings 13 from point E over conductor 33, contact 24, and conductor 34 to point F. When the switch 20 is closed the motors No. 1 and No. 2 are energized and usually come up to speed at different rates, depending upon their loads and various other non-identical factors at each motor, and generally never reach identical speeds before interlock. Thus, a different alternating current frequency occurs at terminals A, C and E of motor No. 1 than at terminals B, D and F of motor No. 2.

Referring now to the control system, which insures that contacts 24, 25 and 26 close only at the time that substantially no voltage exists between points A and B, C and D, and E and F, it will be noted that when switch 20 is closed relay 36 is energized. Relay 36 is a time delay relay which permits the motors to reach, or nearly reach, their running speed or speeds before its contact 37 closes. Upon the closing of contact 37 a circuit is made from point A over conductor 28, contact 37, conductor 39, the winding of relay 40, conductor 41, normally closed contact 43 of a relay 44, and conductor 29 to point B. Now if a voltage above a certain predetermined threshold value exists between points A and B, and thus across the winding of relay 40, the upper contact 45 of relay 40 will be opened and its lower contact 46 will be closed.

To indicate the variation in the voltage across relay 40, reference is made to Fig. 2 wherein the alternating voltage at point A is shown by a sine curve 50 and the alternating voltage at point B is shown by a curve 51, the difference in the frequency of the generated voltages being due to the difference in speeds of the two motors. A curve 52 is a composite curve representing the voltage difference existing across the winding of relay 40 when the frequencies of the voltages at point A and B are as shown in curves 50 and 51. Thus, at point $v$ the voltages at points A and B are both positive, and of comparable magnitude so no voltage exists across relay 40. At a subsequent time, such as $w$, the voltage at point A is negative when the voltage at point B is positive, thus, producing a maximum voltage differential across the winding of relay 40. At point $x$ the voltage difference is again zero, as at point $v$, while at point $y$ the differential is again maximum, as at point $w$, point $z$ being another zero differential point. For other speed differences, the curves 50 and 51 may vary but a variation similar to curve 52 will be produced with a different time axis. Thus, the relay 40 may be sensitized to operate at a voltage level such as shown by the line 53 and it will remain actuated as long as the voltage differential is above this level.

As mentioned above, the actuation of relay 40 opens contact 45 and closes contact 46, the closing of contact 46 energizing a relay 55 over a circuit from the switch 20 over conductor 56, the winding of relay 55, conductor 58, closed contact 46, conductor 59, conductor 60, and conductor 61. The energization of relay 55 closes its contacts 64 and 65, contact 64 being a locking contact which locks relay 55 over a circuit from switch 20, conductor 56, the winding of the relay 55, contact 64, conductor 67, and conductors 60 and 61. Thus, contact 65 closes a circuit controlled by contact 45 of relay 40.

Since the voltage on relay 40 follows curve 52 it becomes de-energized to close contact 45 when the voltage between points A and B drops below the threshold level 53 in Fig. 2. The closing of contact 45 thus completes an energizing circuit for relay 44 over conductors 61, 60 and 59, closed contact 45, conductor 70, closed contact 65, conductor 71, winding of relay 44, and conductors 72 and 56. Relay 44 will now be actuated and its contacts 24, 25 and 26 will simultaneously close to interconnect terminals A, C and E of motor No. 1 with respective terminals B, D and F of motor No. 2. Since actuation of relay 44 can only occur when relay 40 is de-energized, which is at the time the voltage between the respective terminals between the two motors is below level 53, the rotors of the two motors will be connected at substantially zero potential difference between them. The energization of relay 44 also closes a holding contact 77 which locks relay 44 over conductors 61 and 60, closed contact 77, winding of relay 44 and conductors 72 and 56. Thus, contacts 24, 25 and 26 remain closed until the motors are de-energized by the opening of switch 20. The actuation of relay 44 also opens contact 43 which prevents any further actuation of the relay 40.

The above interlocking circuit is, therefore, fully automatic to the extent that it is only necessary for the operator to close the switch 20 which action results in bringing the motors up to their running speeds, or nearly so, and in interlocking the alternating current generating rotors at a time of substantially zero potential between the respective terminals thereof. Although the system has been described for use with motion picture sound recording apparatus it may also be used for interconnecting the terminals of paralleled alternating current generators at the proper instant.

I claim:

1. A control system for interconnecting varying voltage terminals when the voltage between said terminals is substantially zero, said system comprising a plurality of conductors connected between said terminals, contact means in said conductors for making and breaking the connections made by said conductors, a relay for making and breaking said contact means, a voltage source connectable to said relay, a second relay connectable in one of said conductors and energized and de-energized by a predetermined voltage differential between the terminals connected by said conductor, contacts on said second relay, a third relay connectable to said voltage source and energized thereby over said contacts of said second relay when said second relay is actuated, contacts on said third relay, and conductors between the contacts of said third relay, said first relay, and said voltage source for completing an energizing circuit for said first relay upon de-energization of said second relay.

2. A control system in accordance with claim 1 in which are provided a fourth relay connected to said voltage source, contacts for said fourth relay, and conductors connecting said contacts, said voltage source, and said second relay for controlling the energization of said second relay, said fourth relay having a time delay to permit the generation of voltage between said varying voltage terminals.

3. A control system for interconnecting the alternating current terminals of a plurality of multiduty motors when the voltage between said terminals is substantially zero comprising a direct current source, conductors connecting said source and motors for energizing said motors, a plurality of conductors interconnecting said motors, a relay having a plurality of contacts in said plurality of conductors, said conductors connecting said relay to said direct current source to energize said relay, said conductors closing upon actuation of said relay to connect said alternating current terminals, a time delay relay, conductors connecting said time delay relay and said direct current source to energize said time delay relay, said time delay relay operating a predetermined time interval after said motors are energized by said source, a second relay, conductors connecting one of the contacts of said first relay, said first relay and one of said plurality of conductors interconnecting said motors, said second relay being actuated by the voltage differential between said alternating terminals, contacts on said second relay, a third relay, conductors connecting the contacts of said second relay, said third relay, and said direct current source, said third relay being energized by said direct current source upon actuation of said second relay, contacts on said third relay, said third relay thereby controlling the energization of said first relay from said direct current source upon de-energization of said second relay.

4. A control system in accordance with claim 3 in which said third relay is provided with a locking contact.

5. A control system in accordance with claim 4 in which said first mentioned relay is provided with a locking contact and another contact adapted to be opened upon energization of said relay to prevent energization of said second mentioned relay.

6. A control system for interconnecting the alternating current terminals of a plurality of multiduty motors when the voltage between said terminals is substantially zero comprising a direct current power source, and a plurality of relays, each relay having contacts, conductors interconnecting said terminals, conductors connecting the contacts of one of said relays with a second relay to energize said second relay by the voltage differential between said terminals, time delay relay, conductors connecting said time delay relay and said direct current source to energize said time relay from said direct current source, conductors connecting the contacts of said time delay relay, said second relay, and the contacts of said first relay, a fourth relay, and conductors connecting said fourth relay, said direct current source, and the contacts of said second relay to energize said fourth relay from said direct current source upon energization of said second mentioned relay.

7. A control system for interlocking a plurality of alternating current terminals at substantially zero voltage comprising a first set of alternating current terminals having an alternating voltage thereon, a second set of alternating current terminals having an alternating voltage thereon varying in a timed relation with said first voltages, conductors interconnecting said two sets of terminals, a plurality of normally open contacts in said conductors, a voltage source, a first relay, conductors between said voltage source and said relay to actuate said relay and for closing said contacts, a second relay having contacts, conductors interconnecting said second relay, a contact of said first relay, and one terminal of each of said sets of alternating current terminals, said second relay being energized by the alternating current between said terminals, a third relay having contacts, and conductors interconnecting said third relay, a contact for said second relay, said voltage source, and a contact of said third relay to energize said first relay when said second relay is de-energized.

8. A control system in accordance with claim 7 in which are provided a fourth relay having contacts in the conductor between one of said sets of terminals and said second relay, and conductors between said fourth relay and said voltage source.

GLENN R. ANDERSON.

REFERENCES CITED

The following references are of record in the file of this patent:

UNITED STATES PATENTS

| Number | Name | Date |
| --- | --- | --- |
| 1,626,495 | Anderson | Apr. 26, 1927 |
| 2,089,448 | Swanson | Aug. 10, 1937 |
| 2,169,853 | Seeley | Aug. 15, 1939 |
| 2,399,699 | Wahlberg | May 7, 1946 |